United States Patent [19]

Ichikawa et al.

[11] 4,062,631

[45] Dec. 13, 1977

[54] SHEET HANDLING OF A COPYING MACHINE

[75] Inventors: Yasuhiko Ichikawa; Fumiyasu Hayakawa, both of Hachioji, Japan

[73] Assignee: Konishiroku Photo Industry Co., Ltd., Nihonbashi-Muro, Japan

[21] Appl. No.: 556,115

[22] Filed: Mar. 6, 1975

[30] Foreign Application Priority Data

Mar. 7, 1974 Japan .................................. 49-26939

[51] Int. Cl.2 ............................................. G03B 15/22

[52] U.S. Cl. ....................................... 355/3 R; 355/16

[58] Field of Search ................. 355/3 BE, 16; 271/80, 271/174, 188, 209, DIG. 2; 226/93–96

[56] References Cited

U.S. PATENT DOCUMENTS

| | | | |
|---|---|---|---|
| 3,508,824 | 4/1970 | Leinbach et al. | 355/3 R |
| 3,741,640 | 6/1973 | Hickey et al. | 355/16 X |
| 3,836,245 | 9/1974 | Hastwell et al. | 355/16 X |
| 3,976,375 | 8/1976 | Kurita et al. | 355/14 |

*Primary Examiner*—Donald Griffin

[57] ABSTRACT

A method of separating a transfer sheet from an image bearing member electrostatically adhered thereto for an electrostatic recording system of transfer type, in which a toner image is formed on the image bearing member and then electrostatically transferred to the transfer sheet placed in contact with the member. The image bearing member is bent together with the transfer sheet at the position subsequent to the image transfer position, whereby the transfer sheet is separated from the surface of the member due to toughness of the sheet.

4 Claims, 3 Drawing Figures

SHEET HANDLING OF A COPYING MACHINE

Figure 1:
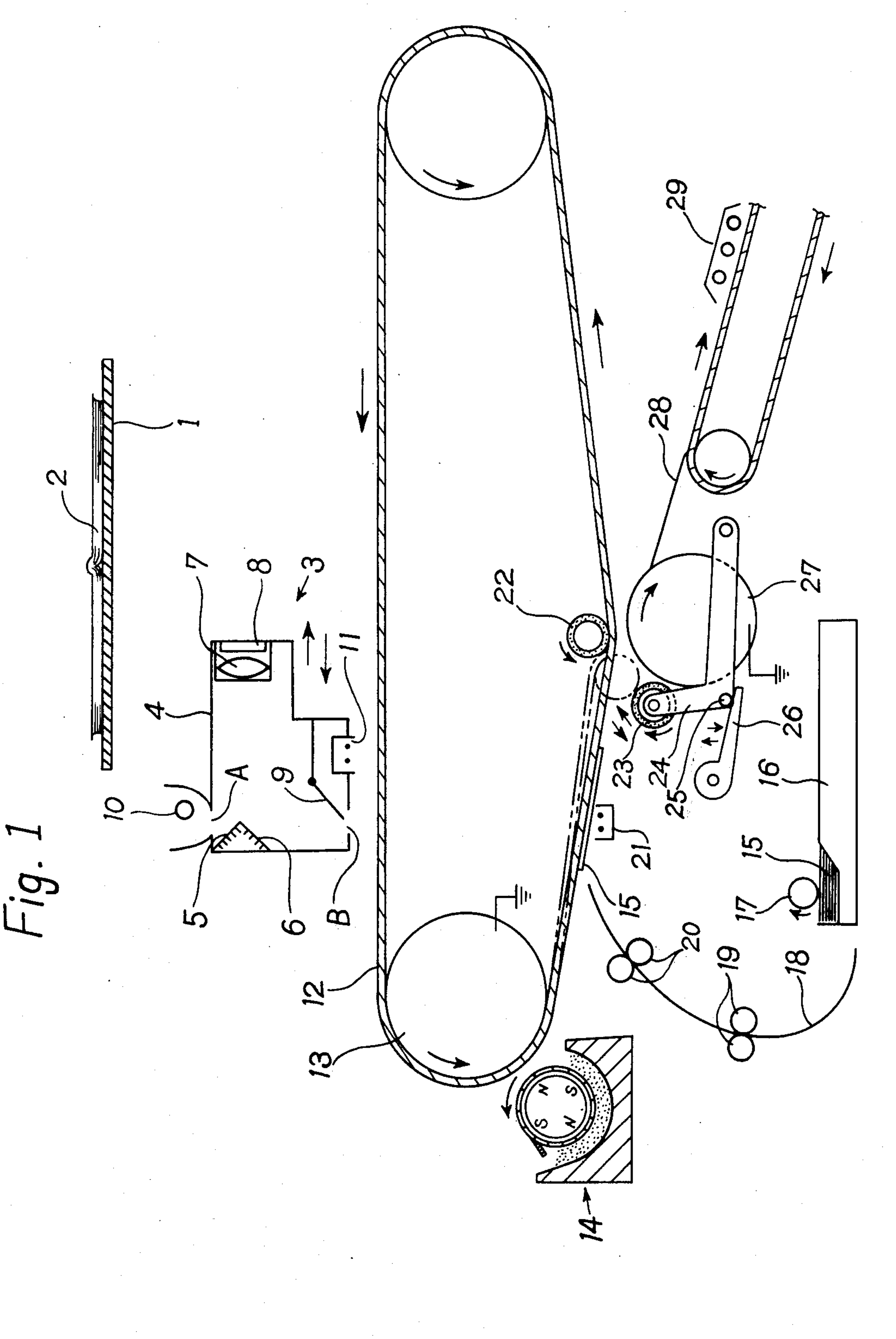

This invention relates to a method of separating a transfer sheet the surface of an image bearing member in an electrostatic recording system, wherein an electrostatic latent image in transferred on the transfer sheet, and also relates to an apparatus for achieving such separation.

In general, in an electrostatic recording system such as, for example, electrophotographic reproduction system, an electrostatic latent image is formed on the surface of an image bearing member arranged in close contact with an endless belt by means of a familiar technique and is brought into contact with a developer consisting of toner and carrier to change the latent image into a toner image which is visible, and then the toner image is electrostatically transferred onto a transfer sheet such as ordinary paper, a plastic film or the like and finally the transfer sheet is separated from the surface of the image bearing member and thermally heated for fixing the image to produce reproduction thereof.

A problem has arisen in the separation of the transfer sheet wherein failure of the separation and crumple of the sheet are likely to occur due to the procedure that the sheet has to be separated from the surface of the image bearing member travelling in an electrostatically attractive relation therebetween.

There have accordingly been proposed various kinds of methods of such separation and apparatus therefor. Among them, one familiar method is mechanical separation relying upon swinging movement of a pawl made of a rigid material. In this mechanical separation, the pawl is pressed onto the surface of the image bearing member to separate a transfer sheet therefrom and positive separation is thus assured. However, such separation has drawbacks in that rigidity of the pawl may cause any damage onto a part of the image bearing member surface and may injure the tip edge of the transfer sheet.

Another approach is such that separation is effected by blowing air under pressure into between the image bearing member and the tip edge of the transfer sheet. This is advantageous in that there is no provision of a swinging member such as the pawl as above mentioned, however is disadvantageous in that there is difficulty in adjustment of the amount of air to be blowed in view of the fact that weak blowing results in no separation of the transfer sheet while too strong blowing results in toner particles being blown away and that addition of a pressurizing source may cause a separating apparatus to be of large size.

Still another method of separation relies upon a suction means which has, however, drawbacks in that overall dimentions of a separation machine is large and large sound of operation is produced therein.

According to further method, an additional corona discharging device is arranged subsequently to a corona discharging device for transferring the toner image to the transfer sheet and activated to weaken electrostatic attractive force between the image bearing member and the transfer sheet after transfer of the image and then separation of the sheet is effected with the aid of the pawl, the air blowing under pressure or the like. With this method, it is true that the previous neutralization of electrical charges between the image bearing member and the transfer sheet facilitates separation, but there is also drawbacks in that dangers are increased due to additional provision of the neutralizing corona discharging device and a power source therefor.

The present invention aims to remove the drawbacks as above referred to with respect to the conventional separation and to attain perfect separation of the transfer sheet from the image bearing member with a simple expedients. It is therefore an object of this invention to provide a method of separating a transfer sheet characterized in that the image bearing member is bent together with the transfer sheet at the position subsequent to the image transfer position whereby the transfer sheet is separated from the surface of the member owing to toughness of the sheet.

It is another object of this invention is to provide an apparatus for separating a transfer sheet from the surface of an image bearing member characterized by separating means comprising a pair of rollers so arranged that an image bearing member is bent together with a transfer sheet while they are travelling together so as to separate the transfer sheet from the image bearing member, one of said pair of rollers being located at one side of the image bearing member and the other located at the other side of the member.

Figure 2A:
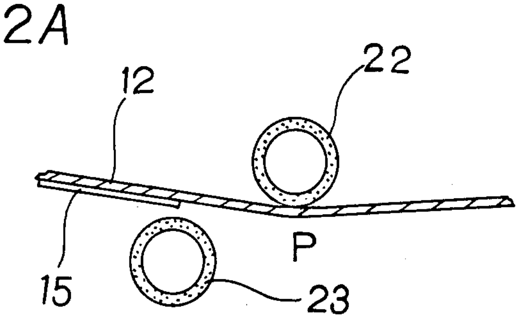
Figure 2B:
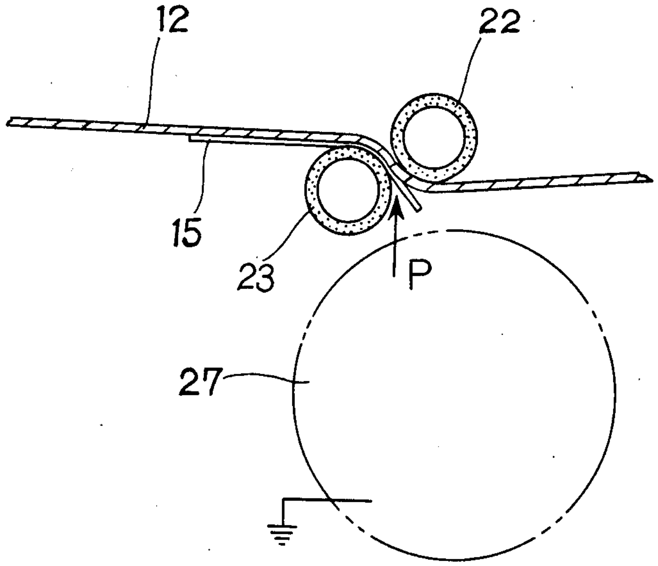

The above and other objects and features of the present invention will now be readily understood by reference to the following description together with accompanying drawings wherein;

FIG. 1 shows schematically a typical electrophotographic reproduction system and FIGS. 2A and 2B show in an enlarged scale the manner in which separation of a transfer sheet is effected.

Referring now to FIG. 1 in which a typical electrophotographic reproduction system is shown schematically, there are provided a mount plate 1 on which any kind of originals 2 to be reproduced is placed and a reciprocative optical unit 3 comprising a frame 4 with an upper opening A and a lower opening B, two reflection mirrors 5 and 6 located in the frame 4 slantingly at 45° with respect to the optical axis, a lens 7 and a right-angled prism 8. On the frame 4 are also provided a light amount adjusting board 9, a lamp 10 for illuminating the original 2 and a corona discharging device 11. An image bearing member 12 which is made in the form of an endless belt has integrally on its outside surface a photoconductive insulating layer consisting, for example, of zinc oxide dispersed in resin. The image bearing member 12 may of course be made of two sheets attached to the endless belt at its symmetrical position by a proper adhesive means. The image bearing member 12 is driven by a cylindrical drum 13 to travel in the direction indicated by an arrow, which drum 13 is coupled to a proper driving means (not shown). A developing device 14 of magnetic brush type is located in the vicinity of the travelling path of the image bearing member 12. A volume of image receiving sheet 15 is housed in a cassette 16 and is fed out one by one by a feed roller 17 from the uppermost sheet which feed roller 17 is controlled to actuate in harmony with the reciprocative movement of the optical unit 3. The transfer sheet 15 thus fed out is guided by a guide plate 18 and transported by a first pair of transporting rollers 19 and a second pair of transportating rollers 20. The toner image formed by the developing device 14 on the image bearing member 12 is electrostatically transferred to the transfer sheet 15 at an image transfer position by a transfer electrode 21 which may be a corona discharging device, while travelling in an overlapping relationship with the image bearing member 12. A pair of rollers 22 and 23 are located in the vicinity of the travelling path of the image bearing member 12, one 22 of which is located inside the path to apply tension to the element 12 all the time and is rotatable in the direction indicated by an arrow, and the other 23 of which is moved to the position indicated by a dotted line in order to cooperate with the roller 22 to deflect the image bearing member 12 from its normal path as shown by a two-dot chain line in FIG. 1, so that the element 12 is bent at the position P in FIGS. 2A and 2B. The roller 23 is rotatably mounted on one end of a L-shaped pivotted support arm 24 which in turn has a projection 25 on its intermediate portion. A pivotted lever 26 functions to bring the member 23 into operative relation with the member 22 through the projection 25 and is mechanically connected to a proper driving means to actuate in timing relation with reproduction operation.

FIGS. 2A and 2B show in different stages how the transfer sheet 15 is separated from the image bearing member 12.

After the toner image on the image bearing member 12 is transferred to the transfer sheet 15 by a transfer electrode or the corona discharge device 21 while travelling in an overlapping relation with the member 12, the sheet 15 advances into the separation position where a pair of rollers 22 and 23 are located, while being electrostatically adhered to the member 12, as shown in FIG. 2A. When the transfer sheet 15 has reached the position where the roller 22 is located, the roller 23 is moved up to cooperated with the counterpart 22, so that the image bearing member 12 is bent together with the transfer sheet 15 by the rollers 22 and 23. However, the sheet 15 advances straightly without following the member 12 owing to its toughness with the result that the sheet 15 is separated from the member 12 as clearly shown in FIG. 2B.

Turning again to FIG. 1, an electrically conductive roller 27 is disposed below and in the vicinity of the roller 22 and electrostatically attracts the transfer sheet 15 thus separated from the image bearing member 12 by means of the static electricity of the sheet, thereby completing separation thereof. For this end, the roller 27 is rotated in the direction indicated by an arrow at the same tangential speed as the image bearing member 12. The roller 27 is provided on it peripheral surface with a plurality of grooves (not shown). The transfer sheet 15 electrostatically attracted by the roller 27 is separated by a guide rods 28 with its one end engaging with the grooves of the roller 27 and brought to a fixing device 29.

With the arrangement made as above according to the present invention, the operation is such that an original 2 is put on the mount plate 1 and, upon commencement of reproduction operation, the optical unit 3 moves rightwards to produce an electrostatic latent image is produced on the image bearing member 12. The latent image thus produced is changed into a visible toner image with the developing device 14 and then the toner image is electrostatically transferred by means of the transfer electrode 21 onto the transfer sheet 15 supplied from the cassette 16. After transfer, the image bearing member 12 and the transfer sheet 15 are bent together while travelling by the pair of rollers 22 and 23, and at the same time the sheet 15 is separated at its tip edge from the member 12 and attracted by the electrostatic attractive force established between the electric charge carried on the transfer sheet 15 and electrically conductive and grounded roller 27, thereby completing separation of the sheet 15. After thermally fixing the toner image on the sheet at the fixing device 29, reproduction of the original 2 is obtained.

It will be easily understood from the foregoing description that the method of separation according to the present invention assures positive separation with simple arrangement and is very superior in that no noisy sound is produced and no damage is done to the image bearing element.

It is to be noted that the pair of rollers 22 and 23 may be kept in pressing relation to each other and that one of the rollers 22 need not necessarily be rotatable.

In addition, the grounded electrically conductive roller 27 may be replaced by an electrically conductive roller maintained at a constant potential of the opposite polarity to that of the electric charges carried on the transfer sheet 15, or an electrically insulating roller combined with an electrically charging electrode capable of providing the roller with electric charges of opposite polarity to that carried on the transfer sheet 15.

It is of course possible in this invention to complete separation of the transfer sheet from the image bearing member and to lead the same to the fixing device, by means of a mechanical means combined with a guide member and pneumatic means such as suction member instead of the use of electrostatic attraction as embodied in the drawings.

What we claim is:

1. A method of separating a transfer sheet from an image bearing member electrostatically adhered thereto for an electrostatic recording system of transfer type comprising the steps of forming a toner image on said image bearing member, placing a transfer sheet in contact with said image bearing member, transferring electrostatically said image to said transfer sheet placed in contact with said member, bending said image bearing member together with said transfer sheet at a separation position subsequent to an image transfer position when the front edge of said transfer sheet reaches or passes said separation position by a substantially small distance, pressing positively one of separating members against the image bearing member together with the transfer sheet, whereby said transfer sheet is separated from the surface of said member due to toughness of the sheet, said transfer sheet being separated forcibly from the surface of said image bearing member, said transfer sheet being held in close contact with said image bearing member by electrostatically attractive forces, and including the step of placing a pair of separating members at said separation position, one of said separating members being located at one side of image bearing member and the other separating member being located at the other side of said image bearing member, at least one of said separating members being pressed against said image bearing member together with said transfer sheet when said front edge of said transfer sheet reaches or passes said separation position.

2. A method of separating a transfer sheet from an image bearing member for an electrostatic recording system of transfer type comprising the steps of: holding said transfer sheet in close contact with said image bearing member by electrostatically attractive forces at an image transfer position; applying pressure against said image bearing member together with said transfer sheet by moving a roller from one position in which said member is in undistorted position to a second recording position; applying pressure against said member in accordance with a recording operation, so that said image bearing member and transfer bearing sheet are bent; and forcibly separating said transfer sheet from the surface of said image bearing member at said separation position subsequent to said image transfer position.

3. A method according to claim 2 wherein the separated transfer sheet adheres electrostatically to a rotatable cylindrical member in the vicinity of said separating members, and including the step of transporting said transfer sheet further away from said image bearing member and inhibiting electrostatic readhesion to said image bearing member.

4. In an electrostatic recording apparatus an arrangement comprising an optical unit for forming an electrostatic latent image on an image bearing member, developing means for changing said latent image into a visible toner image, transferring means for electrostatically transferring said toner image to a transfer sheet, means for separating said transfer sheet from the surface of said image bearing member at a separation position subsequent to an image transfer position, means for fixing the transferred toner image on said transfer sheet, said separating means comprising a pair of rollers, a first of said rollers being located at one side of said image bearing member and a second roller being located at the other side of said image bearing member, at least one said pair of rollers being pressed against said image bearing member together with said transfer sheet by moving one of said rollers from a position in which said member is in undistorted position to a second position in which pressure is applied against said member in accordance wtih a recording operation, whereby both are bent and said transfer sheet is separated forcibly from the surface of said image bearing member at a separation position subsequent to said image transfer position.

* * * * *